United States Patent [19]

Swaby

[11] 4,338,060
[45] Jul. 6, 1982

[54] BUNDLING OF METAL STOCK

[75] Inventor: Harold Swaby, Rotherham, England

[73] Assignee: British Steel Corporation, England

[21] Appl. No.: 158,217

[22] Filed: Jun. 10, 1980

[30] Foreign Application Priority Data

Jun. 12, 1979 [GB] United Kingdom ............ 7920384

[51] Int. Cl.³ .......................................... E21B 19/14
[52] U.S. Cl. ................................. 414/748; 198/485; 414/92
[58] Field of Search ............. 414/745, 748, 92, 96, 414/93; 198/485

[56] References Cited

U.S. PATENT DOCUMENTS 3,780,883 12/1973 Brown ........................ 414/748 X

FOREIGN PATENT DOCUMENTS 813750 6/1957 United Kingdom .
1033142 6/1963 United Kingdom .

Primary Examiner—Douglas C. Butler
Attorney, Agent, or Firm—Bacon & Thomas

[57] ABSTRACT

This invention relates to a method of bundling bars together which reduces the sound levels generated hitherto in conventional bundling pockets. In particular, bars are successively and separately transported laterally from a support table to run down an arm which is reciprocably movable by a motor driven mechanism. Movement of the arm upwards forces a pawl away from the position shown affording access to the bar into the bottom of the pocket, the bar being carried upwardly by the arm against the downward pressure of any bundled bars already in situ. The pawl returns to its position of rest before the arm is retracted and the cycle is repeated.

8 Claims, 2 Drawing Figures

BUNDLING OF METAL STOCK

This invention relates to the bundling together of elongate metal stock and more particularly relates to the bundling of bars in e.g. steelworks. The term 'bar' is to be understood to embrace billets (square section), rods (circular or hexagonal section) or rounds (large diameter rods) and include tubes.

In steelworks bars are usually bundled after processing into pockets, the bars being laterally transported to the edge of the pocket and then allowed to fall under gravity into the pocket on to other bars which may be there. This is a noisy process and sound pressure levels generated are frequently well in excess of the maximum recommended by official bodies.

It is an object of this invention to provide a method of, and apparatus for, bundling together metal stock which is less noisy than hitherto and which is yet operable at a high rate and efficient in operation.

From one aspect the present invention provides a method of bundling together elongated metal stock which is separately and successively transported laterally from a support table to a common retaining pocket, in which the stock is forced into the pocket from below by a mechanism operable in conjunction with the stock to advance and afford access to the bottom of the pocket, forcibly lifting the stock into the pocket amongst any bundled stock in situ, and to retract to close the pocket and seal the escape of stock during the return.

The invention also provides apparatus for performing this method, in which, preferably, the mechanism includes first and second reciprocable members, the first being operable to lift the stock against the second member, moving the member from a position of rest in which it seals the bottom of the pocket to another position thereby to afford access to the pocket for the stock, the second member returning to its rest position to seal the pocket before retraction of the first member.

The first member may comprise a power driven arm, whilst the second member may be a spring biassed pawl-both members being located at a 'station' of which there may be many located along the length of the pocket.

The bars may be fed by a simple selector drive, the bar transport being synchronised with the motion of the first member.

By bundling the bars from below the pocket in this fashion therefore the noisy impact between falling bars is avoided without any appreciable diminution in the rate of feed or the utilisation of complex and expensive equipment.

In order that the invention may be fully understood, one embodiment thereof will now be described, by way of example, with reference to the accompanying drawing, in which.

Figure 1:
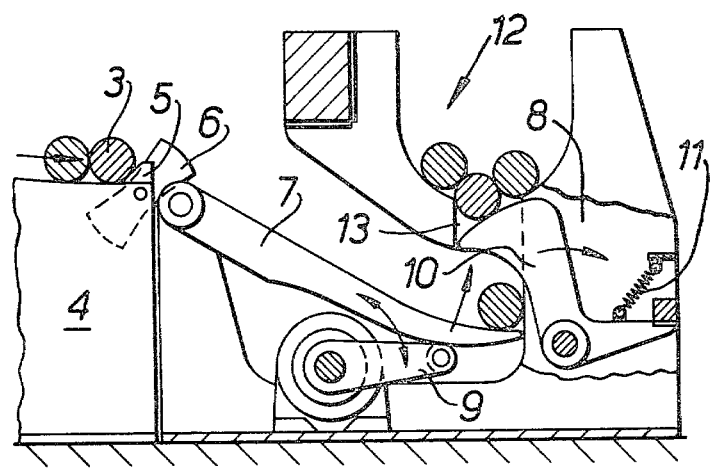
FIG. 1 is an end elevation of apparatus according to this invention.

Referring now to the drawings, rods 3 on a transport table 4 are individually lifted over a nose 5 by a rotatable selector 6 so as to run down a pivotally mounted arm 7 and abut a stanchion or stop member 8. A motor driven arm 9 reciprocably rotatable through an arc and synchronised with the selector 6 lifts the arm 7 carrying the rod with it forcing a pawl 10 laterally back against the restraining action of a spring 11 permitting access to the pocket 12 through a slot 13. As the rod is forced upwardly through the slot it abuts any rods already in situ thus preventing them from coming out. When the lifted rod clears the pawl 10 the latter returns to its rest position closing the slot and the arm 7 returns in a controlled fashion (by arm 9) to the position shown.

The cycle is then repeated, and the bundled bars are removed from the pocket by e.g. chain slings, at intervals.

Figure 2:
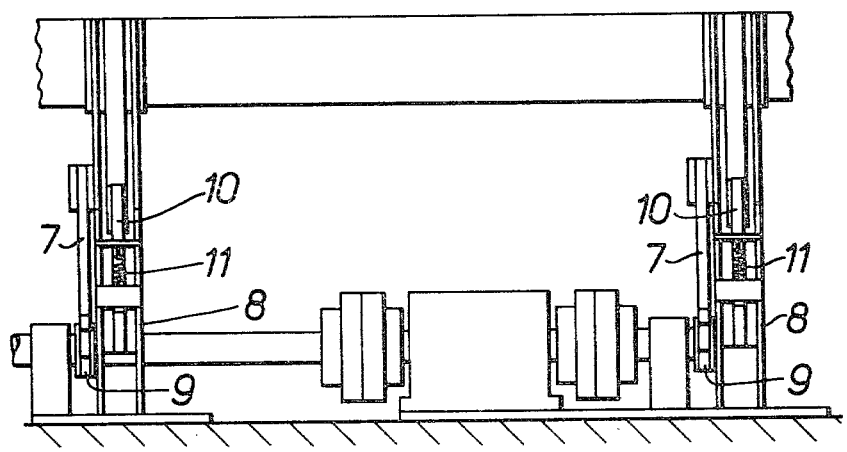
FIG. 2 is a side elevation showing part of this apparatus.

As is apparent from FIG. 2 a plurality of 'stations' are disposed at intervals along the whole length of the pocket which is designed to accommodate bars of a wide variety of lengths.

Although this invention has been described with reference to the particular embodiment illustrated, it is to be understood that various modifications may readily be made without departing from the scope of this invention. For example, a different form of selector drive may be utilised and this item together with the other drive and bias mechanisms may incorporate hydraulic control functions. Sound deadening materials may also be used at places of impact to reduce noise levels even further.

I claim:

1. A method of bundling together elongated metal stock, comprising laterally transporting said stock separately and successively from a support table to a position on a first pivotal member below a common retaining pocket having a bottom opening provided with a pivotal closure member, lifting said stock upwardly by said first pivotal member against said closure member to force said pivotal closure member to be laterally displaced by movement around its pivotal axis to thereby provide access to the bottom of said pocket, forcibly lifting said stock into the pocket by continued pivotal action of said first pivotal member against any bundled stock in situ, and retracting said pivotal members in such manner that the pivotal closure member is operative to close the pocket and seal the escape of stock before the return movement of the first pivotal member.

2. A method according to claim 1, in which the stock is transported from the support table in synchronism with the operation of the first pivotal member for lifting the stock into the pocket.

3. Apparatus for bundling together elongated metal stock in a pocket, comprising a mechanism for separately and successively receiving said stock, said mechanism comprising first and second pivotally mounted members and including motive means operable on the first member to lift the stock against the second member whereby to move the second member laterally from a position of rest in which it seals the bottom of the pocket to another position such as to afford access to the pocket for the stock, the second member returning to its rest position to seal the pocket before retraction of the first member.

4. Apparatus according to claim 3, comprising a support table from which the stock is discharged to the mechanism, and in which the first member is downwardly inclined from a pivotal axis adjacent to the support table whereby the stock moves along the first member under gravity on discharge from said table.

5. Apparatus according to claim 4, in which the mechanism includes a stop against which the stock abuts following discharge from the table, the second member being in the form of a pawl pivotally mounted on the stop, part of which pawl overlies the stock and the first member and seals the bottom of the pocket.

6. Apparatus according to claim 5, in which the pawl is an idler, a spring being provided for biassing the pawl into its rest position.

7. Apparatus according to claim 4, comprising a plurality of stations laterally displaced from one another together forming a common pocket and each including a said mechanism, all the mechanisms being aligned with one another thereby to accommodate a wide variety of stock lengths.

8. Apparatus for bundling together metal bars in a pocket, comprising a support table for said bars and a plurality of stations spaced apart in alignment with one another along the length of said table, each station comprising a U-shaped pocket and a mechanism co-operating therewith for separately and successively receiving said bars discharged laterally from the table, said mechanism comprising an arm downwardly inclined from a pivotal axis adjacent the support table along which the bars roll under gravity on discharge, a stop against which the discharged bar abuts, and a pawl, pivotally mounted and overlying both the bar and the arm and designed in its rest position to seal the bottom of the pocket, motive means being provided to operate on the arm in synchronism with the discharged bars whereby to lift the bar against the pawl to move it laterally from its said position of rest to another position thereby to afford access to the pocket for the bar, the pawl being biassed to return to its rest position to seal the pocket before retraction of the arm for a subsequent cycle.

* * * * *